United States Patent [19]
Hayes

[11] Patent Number: 6,106,731
[45] Date of Patent: Aug. 22, 2000

[54] SYSTEM AND METHOD FOR OZONATING WATER FOR ANIMAL HOUSES

[76] Inventor: Charles R. Hayes, 3473 Trinity Church Rd., Seagrove, N.C. 27341

[21] Appl. No.: 09/166,190

[22] Filed: Oct. 5, 1998

[51] Int. Cl.$^7$ ...................................................... C02F 1/78
[52] U.S. Cl. .......................... 210/760; 210/739; 210/765; 119/72
[58] Field of Search ................................... 210/739, 758, 210/760, 765; 119/72

[56] References Cited

U.S. PATENT DOCUMENTS

| | | | |
|---|---|---|---|
| 4,599,166 | 7/1986 | Gesslauer | 210/96.1 |
| 4,619,763 | 10/1986 | O'Brien . | |
| 5,075,016 | 12/1991 | Barnes | 210/760 |
| 5,250,177 | 10/1993 | Cho . | |
| 5,431,861 | 7/1995 | Nagahiro et al. | 261/140.1 |
| 5,598,316 | 1/1997 | Kasting, Jr. | 361/212 |
| 5,824,243 | 10/1998 | Contreras | 261/36.1 |

*Primary Examiner*—David A. Simmons
*Assistant Examiner*—Betsey J. Morrison
*Attorney, Agent, or Firm*—Coats & Bennett, PLLC

[57] ABSTRACT

The present invention relates to the treatment of water using ozone, and more particularly to an ozone-based water purification system for use in animal houses and the like. In the embodiment described herein, the water treatment system comprises a main holding or contact tank, a relatively small re-circulation pump, an ozone generator, and an ozone injector. Normal operation of this water treatment system involves the receipt of raw or untreated water from a pressurized water main, such as that typically provided by a public water works system. This raw or untreated water is held in the contact tank at or near the pressure of the supplying water main. Actuation of the ozonation re-circulation loop causes water to be drawn from the contact tank by the re-circulation pump and passed through the adjacent venturi-type ozone injector. The pressure differential necessary for successful operation of the venturi injector is provided by the re-circulation pump and may be adjusted by a pressure regulator which is operably associated with the pump. As water is pumped through the venturi injector, an ozone-air mixture provided by the ozone generator is drawn into and mixed with the water passing therethrough. The ozonated stream of water is then circulated back into the contact tank, where it is subsequently mixed with the overall contents of the tank such that the ozone is relatively evenly distributed throughout the tank. Once the contents of the contact tank have been sufficiently purified or disinfected, treated water may be drawn from the tank and passed through a final mechanical filtration stage prior to end use of the water.

18 Claims, 1 Drawing Sheet

SYSTEM AND METHOD FOR OZONATING WATER FOR ANIMAL HOUSES

FIELD OF THE INVENTION

The present invention relates to the reduction of pathogen concentrations in drinking water supplies and more particularly to the elimination of pathogens in the potable water supply of animal houses through the utilization of an ozone-based water treatment system.

BACKGROUND OF THE INVENTION

The cost of ancillary goods and services associated with poultry production has continuously escalated over the past two decades, while retail poultry prices have remained relatively stable. As a consequence, there has been and continues to be significant pressure on poultry producers to develop new technology and production methodologies aimed at reducing costs by way of increasing overall production efficiency.

Two areas of particular interest to commercial poultry producers, with regard to their flock, are feed conversion ratios and bird mortality rates. Feed conversion ratio relates the amount of feed consumed to the amount of dressed, final product, and bird mortality rates relate to the premature death and hence, complete loss of the intended final product. Poultry farmers strive to maximize feed conversion ratios, and minimize bird mortality rates, as optimizing either of these parameters would ultimately lead to lower overall production costs and hence greater profit margins.

One major factor, relevant to both feed conversion ratios and bird mortality rates, is the ambient pathogen concentration within the water supply that is directed to the poultry house and consumed by the birds. It has been well documented, through extensive research, that higher ambient pathogen levels generally lead to less than optimal feed conversion ratios, while leading to higher than optimal mortality rates. Therefore, it is reasonable to assume that generally lowering ambient pathogen concentrations within the feed water supply would lead to improvements in both the feed conversion ratios and mortality rates, and hence would, lead to a generally more cost efficient operation.

While water treatment systems that utilize ozone as the active disinfecting agent have been used previously, these systems generally require that the volume of water being treated should be maintained at or near atmospheric pressure as the ozone is effectively bubbled therethrough. Typically, this requires that the water taken from a water main be dropped from street pressure to atmospheric pressure prior to treatment. Furthermore, following ozonation treatment, the volume of treated water must then be re-pressurized so that the treated water may be effectively pumped to the desired locations and dispersed. This is expensive, as the system must be provided with both a non-pressurized treating and holding tank and a final pressurized tank.

Therefore, there is a need for an ozone water treating system that is relatively simple in design and economical to operate and which generally minimizes the number of tanks and the amount of hardware required.

SUMMARY OF THE INVENTION

The present invention entails a pressurized system for treating water with ozone. Water from a pressurized source is directed into a pressurized ozone treatment tank. Operatively connected to the pressurized ozone treatment tank is an ozone mixing and re-circulation loop that provides for the flow of water from the ozone treatment tank, through the loop, and back to the pressurized ozone treatment tank. Disposed in the loop is an ozone injector that is coupled to an ozone generator. Further disposed within the loop is a booster pump that is connected on the inlet side of the ozone injector and between the injector and the ozone treatment tank. The booster pump functions to pump water from the ozone treatment tank and to boost the pressure of the water prior to the water entering the ozone injector. The presence of the booster pump causes a pressure drop across the injector and this pressure drop causes ozone to be induced into the circulation loop and to mix with the water being circulated through the loop. Thus, the ozone injector functions to create a water-ozone mixture that is directed from the injector back into the pressurized ozone treatment tank. From the ozone treatment tank, the treated water is directed to a watering area where the treated water is consumed by animals, such as chickens.

In a specific embodiment of the present invention, there is provided a flow switch that forms a part of the ozone treating system. The flow switch effectively senses the flow of water from a water source into the ozone treatment tank. Upon the sensing of this flow, the flow switch in turn actuates the booster pump which in turn starts the re-circulation of water from the tank through the ozone mixing and re-circulating loop. In one embodiment the flow switch is operatively connected to the ozone generator and acts to actuate the same in response to there being water flow from the water source to the ozone treatment tank. In this embodiment, a timer control may be employed so as to maintain the booster pump and/or the ozone generator in an operative mode for a predetermined time period after the flow of water from the source to the tank has ceased.

It is therefore an object of the present invention to provide a system for ozonating water for consumption by animals wherein the system is a pressurized system.

Other objects and advantages of the present invention will become apparent and obvious from a study of the following description and the accompanying drawings, which are merely illustrative of such invention.

DETAILED DESCRIPTION OF THE INVENTION

Figure 1:
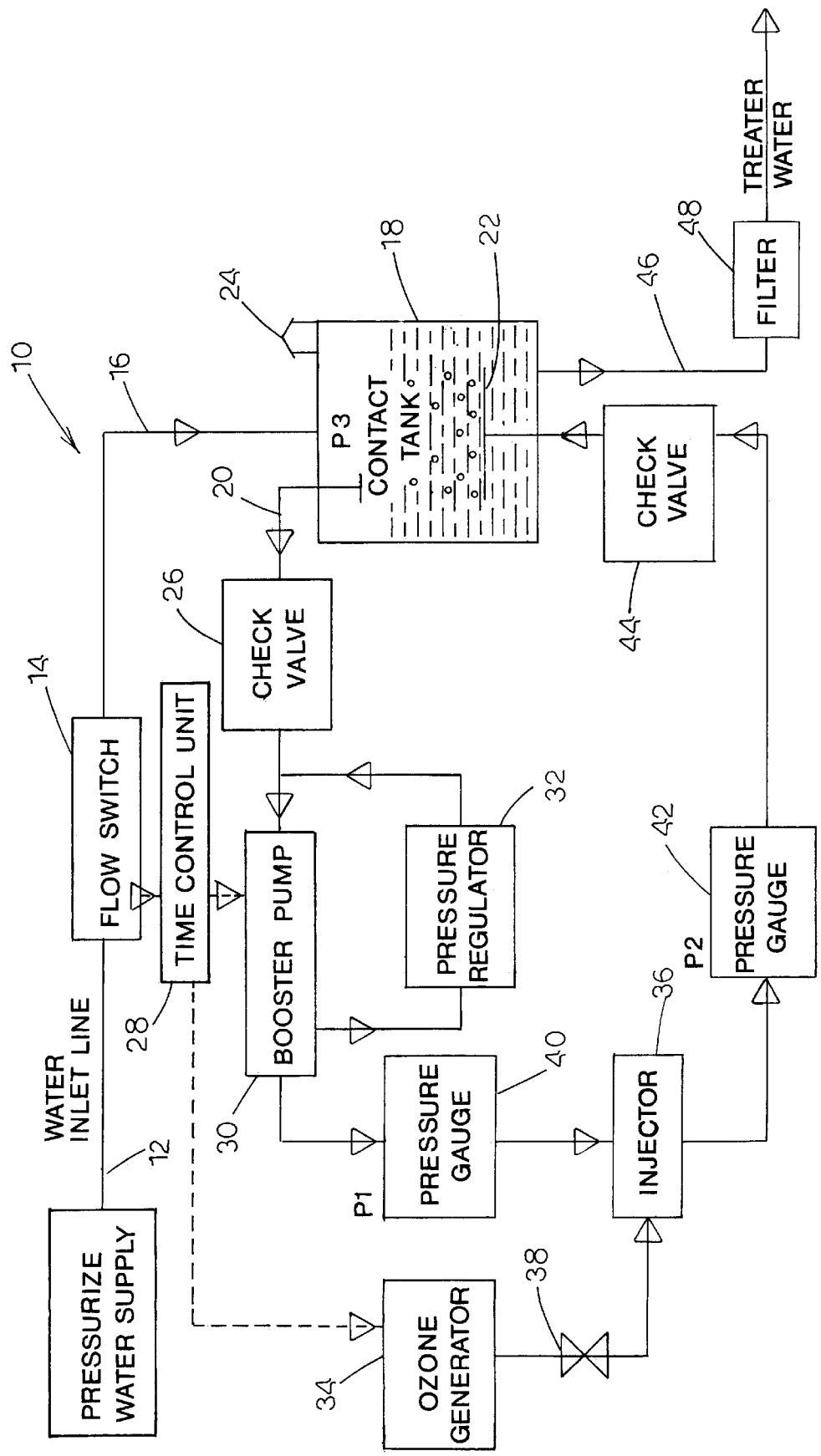
FIG. 1 is a schematic diagram illustrating the animal house feed water ozonation system of the present invention.

Shown in FIG. 1 is a schematic illustration of the poultry house feed water ozonation system of the present invention, generally indicated by the numeral 10. Ozonation system 10 includes a main inlet line 12 that leads from a pressurized water supply to a flow switch 14. From the flow switch 14, a second inlet line 16 leads to a pressurized treatment or contact tank 18. Contact tank 18 is disposed to receive and contain a relatively large reservoir of water at or near the pressure of the supplying water main 12, which typically would be in the range of 35 to 65 psi. Tank 18 connects to a re-circulation outlet line 20, a re-circulation inlet line 22, a pressure relief valve 24, and a main outlet line 46 with an associated filter element 48.

In addition to controlling the flow of raw, untreated water into the contact tank 18, flow switch 14 is also configured so as to actuate a re-circulation control unit 28, where control unit 28 is communicatively coupled to and controls an associated re-circulation booster pump 30. Booster pump 30 takes input from the contact tank 18 via the re-circulation outlet line 20, which includes an in-line check valve 26. Configured so as to control the effective outlet pressure of the re-circulation booster pump 30 is a pressure regulator 32.

Outlet pressure of the re-circulation booster pump 30 is monitored by a first pressure gauge 40. Adjacent and downstream of gauge 40 is a venturi-type ozone injector 36. Ozone is supplied via an associated ozone generator 34 which is coupled to the injector 36 through a flow-metering valve 38. Actuation of the ozone generator 34 is facilitated by the same control unit 28 that is responsible for actuation and control of the re-circulation booster pump 30.

Adjacent and downstream of the injector 36 is a second pressure gauge 42, which is effectively situated between the injector 36 and the contact tank 18. Also, disposed in-line between the pressure gauge 42 and the contact tank 18 is a second check valve 44.

Under typical operating conditions, raw or untreated water is supplied to the treatment system 10 from a water main 12 at a pressure greater than atmospheric pressure. More particularly, the pressurized, untreated water from inlet 12 enters the treatment system 10 via the flow switch or valve space 14, as indicated in FIG. 1. When flow switch 14 is maintained in a closed configuration, no untreated water is permitted to flow from the inlet main 12 and into the adjacent contact tank 18 which is located downstream. Upon actuation of the flow switch 14, the inlet main 12 is effectively coupled to the contact tank 18 via the raw water inlet line 16, thus allowing the untreated, pressurized water to flow from the inlet main through to the tank 18. As such, the contact tank 18 is allowed to fill with water, with the tank contents being brought to the same pressure as that of the inlet main 12. It will be appreciated that the pressure relief valve 24, which is incorporated into the contact tank structure, provides the only pathway for venting the tank contents to the ambient atmosphere. In practice, the pressure relief valve 24 is designed so as to open at a set point that is slightly greater than the operating pressure of the supplying water main 12. As a result, the pressure of the contact tank contents is maintained at or near the pressure of the supplying water main 12.

Returning now to the discussion of flow switch 14 actuation, it will be appreciated that in addition to permitting flow into the tank 18 from the inlet main 12, actuation of the switch 14 causes a secondary actuation of the associated re-circulation control unit 28. The re-circulation control unit 28 is, in turn, responsible for actuating both the re-circulation booster pump 30 and the ozone generator 34. It should be appreciated that in the preferred embodiment considered herein, the control unit 28 may be configured to continue actuation of the booster pump 30 and ozone generator 34 even after the flow switch 14 has been closed or de-actuated. More particularly, the control unit 28 may include a timer feature, which allows the booster pump 30 and ozone generator 34 to remain actuated for a certain pre-determined interval of time following closure or de-actuation of the flow switch 14.

When actuated, the re-circulation booster pump 30 draws water from the contact tank 18 via the re-circulation outlet line 20. As water from the contact tank 18 is drawn into and through pump 30, the pressure of the fluid passing therethrough is raised to a level that is greater than that of the contact tank 18. The resulting, elevated outlet pressure of the booster pump 30 is controlled via the associated pressure regulator 32. This pressure regulator 32 effectively controls the pressure at the pump outlet by diverting and re-circulating a portion of the fluid passing through the pump 30. By varying the amount of fluid that is diverted and re-circulated to the pump inlet, the pressure at the pump outlet may be adjusted accordingly. As pressure regulators of this type are commonly known to those skilled in the art, a more detailed description of the operating principles of such a regulator will not be presented herein. Instead, it will suffice to state that the pressure at the outlet of the re-circulation booster pump 30 is effectively controlled by the action of the associated pressure regulator 32.

The water issued from the outlet of the re-circulation booster pump 30, which has now been raised to a pressure greater than that of the contact tank 18, is then passed through the venturi-type injector 36. It is at the injector 36 that gaseous ozone supplied by the ozone generator 34 is introduced into the stream of water passing therethrough. As such venturi-type injectors and related devices which operate based on the venturi effect are well known to those skilled in the art, only a brief discussion of injector 36 operating principles will be presented herein.

Typical operation of the venturi injector 36 requires that a pressure differential of at least approximately 15% be established and maintained between the inlet and outlet of the injector 36. As discussed above, this pressure differential is created by the re-circulation booster pump 30, and effectively controlled by the associated pressure regulator 32. The pair of pressure gauges 40 and 42 are used to monitor and assist in the adjustment of the regulator 32 so as to establish the desired 15% pressure differential across the injector 36. The establishment and maintenance of this pressure gradient across the injector 36 necessarily results in the flow of water through the injector 36. As the water flows through the injector 36, a relatively low pressure is developed across a venturi inlet tap (not shown) associated with the injector 36 which acts to draw ozone from the adjacent generator 34 into the injector 36. Once drawn into the injector 36 via the venturi inlet tap, the gaseous ozone is mixed with the water flowing therethrough, and becomes effectively incorporated into the flow stream.

Typically, the stream of ozone gas produced by the ozone generator 34 is comprised of approximately 95.0% to 99.2% air and approximately 0.8% to 5.0% pure ozone. This relatively dilute ozone-air mixture is then introduced into the water flow stream via the injector 36 at a rate of approximately 2 to 6 liters per minute. As shown in FIG. 1, the control of the ozone injection rate is provided by the ozone flow-metering valve 38.

Upon exiting the injector 36, the ozone-rich stream of water passes first through check valve 44 and then back into the contact tank 18 via the re-circulation inlet line 22. It should be appreciated that besides providing a pathway for water flow back into the tank 18, the inlet line 22 also serves to generally disperse the ozone-rich water within the tank 18. That is, the inlet line 22 is typically configured so as to facilitate or expedite mixing of the ozone-rich water throughout the volume of the tank 18, so as to achieve a uniform or near uniform distribution of ozone within the contents of the tank 18.

As the injected ozone accumulates in the contact tank 18 and is permitted to thoroughly mix with the water contained therein, disinfection and reduction of pathogen levels within tank water occurs. However, accumulation of the ozone in the contact tank 18 may act to raise the pressure within the tank 18. In response to this elevation in internal pressure, the relief valve 24 is configured to open and effectively vent this build-up of excess pressure to the ambient atmosphere. More particularly, it is the ozone-air mixture that is introduced via the injector 36 which is released to the atmosphere. It should be appreciated that although the ozone is vented to the atmosphere via the relief valve present in the contact tank 18, the overall treatment system 10 is designed such that the ozone-air mixture is able to remain in contact with the tank water for a period that is long enough to insure disinfection or reduction of pathogen concentrations to a safe or acceptable level.

As treated water is required, the contents of the tank 18 are drawn out the main outlet line 46 and through the associated filter 48, which removes any bulk or granular material from the flow stream prior to end use of the water. Once again, it should be appreciated that the contents of the contact tank 18 are maintained at the pressure of the inlet main 12 as a consequence of the direct coupling of the tank 18 to the water main 12. Therefore, additional or auxiliary pumping means are not required to raise or maintain the pressure of contact tank 18 to a level suitable for allowing distribution throughout an associated animal house or houses. That is, as designed, the treatment system 10 only requires the water main 12 to source and maintain the pressure required for normal water distribution operations. For example, in the case where the water main 12 is a pipe connected to a conventional or standard public water system, the burden and associated expense of generating and maintaining nominal water line pressure falls squarely on the public water works system. The benefit of such a system configuration is more fully appreciated when it is considered that the size and operating expense of the booster pump 30 is typically much smaller than the equipment that would be required to provide the same function as the public water system pumps.

Herein, the word water has been used to describe the fluid contained within the contact tank 18 and also, has been used to describe the fluid that is circulated through the system of the present invention. As used herein, the word or term water means water or a mixture of water and ozone.

In FIG. 1, the flow switch 14 is disposed in the water inlet line. It should be appreciated however, that the flow switch 14 can be located in other locations, for example, the flow switch 14 could be disposed between the contact tank 18 and the filter 48. In addition in the schematic of FIG. 1, there is shown a number of check valves. Depending upon the orientation of the pump 30, certain check valves shown in the schematic of FIG. 1 may not be required. For example, the pump can be elevated to such a degree that in some flow lines there would be no need for the provision of a check valve.

In addition, the present invention has been disclosed herein in connection with ozonating water for animal houses. It should be appreciated, however, that the present system and process can be utilized for a wide range of applications including applications for disinfecting water that is utilized to clean and disinfect objects. Moreover, the system and method disclosed herein for ozonating water can be utilized for treating residential water supplies as well as treating water used in many applications other than for animal houses.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of treating water with ozone comprising:
   a) directing water from a pressurized water supply to an ozone treatment tank;
   b) maintaining the ozone treatment tank at a pressure greater than atmospheric pressure;
   c) circulating water from the pressurized ozone tank to an ozone injector and injecting ozone into the injector and mixing the ozone with the recirculating water to form a water-ozone mixture and returning the water-ozone mixture to the pressurized ozone treatment tank;
   d) directing the ozone treated water from the pressurized ozone treatment tank; and
   e) wherein the pressure of the water entering the inlet side of the injector is greater than the pressure within the treatment tank while the pressure of the water-ozone mixture leaving the injector is approximately equal to the pressure of the ozone treated water within the ozone treatment tank.

2. The method of claim 1 including boosting the pressure of the recirculating water on the inlet side of the injector so as to create a pressure differential across the injector so as to increase the efficiency of mixing the ozone with the recirculating water.

3. The method of claim 2 including utilizing a booster pump between the ozone treatment tank and the injector, and pumping water from the ozone treatment tank through the booster pump and boosting the pressure of the water prior to the water being directed into the injector.

4. The method of claim 3 including the step of boosting the pressure of the water directed into the inlet side of the injector to a pressure level that exceeds the pressure level of the water in the ozone treatment tank by at least approximately 15%.

5. The method of claim 3 including sensing the flow of water being directed from the pressurized water source to the ozone treatment tank and actuating the booster pump in response to the flow of water from the pressurized water source into the ozone tank.

6. The method of claim 5 including actuating an ozone generator in response to the flow of water from the pressurized water source into the ozone treatment tank.

7. The method of claim 6 including deactuating the booster pump after a predetermined time period has elapsed following the cessation of flow from the pressurized water source to the ozone treatment tank.

8. A method of treating animal house water with ozone comprising:
   a) directing water from a pressurized water source to an ozone treatment tank;
   b) pumping the water from the ozone treatment tank to a booster pump, and boosting the pressure of the water relative to the pressure of the water in the ozone treatment tank;
   c) directing the water with the boosted pressure from the booster pump to and through an injector and injecting ozone into the passing water to form a water-ozone mixture;
   d) directing the water-ozone mixture back to the ozone treatment tank;
   e) directing the ozone treated water from the ozone treatment tank to an animal watering area where animals drink the ozone treated water; and
   f) wherein the pressure of the water entering the inlet side of the injector is greater than the pressure of the water contained within the ozone treatment tank while the pressure of the water leaving the injector is approximately equal to the pressure of the water contained in the ozone treatment tank.

9. The method of claim 8 including adjusting the pressure of the water leaving the booster pump.

10. The method of claim 9 including recirculating a portion of the water leaving the booster pump back to an inlet side of the booster pump so as to effectively vary the pressure of the water leaving the booster pump.

11. The method of claim 10 wherein there is provided a circulation loop between the outlet and inlet of the booster pump and wherein the circulation loop includes an adjustable pressure regulator that permits the flow of water being circulated around the booster pump to be varied.

12. The method of claim 8 wherein a flow switch is interposed between the ozone treatment tank and the pressurized water source and wherein the booster pump is actuated in response to the actuation of the flow switch which occurs as a result of water being directed from the pressurized water source to the ozone treatment tank.

13. The method of claim 12 wherein an ozone generator is operatively connected to the injector for supplying ozone thereto, and wherein the ozone generator is actuated by the flow switch.

14. The method of claim 8 wherein the pressure of the water entering the injector is at least approximately 15% greater than the water in the ozone treatment tank.

15. The method of claim 8 including recirculating the water around the booster pump to adjust the pressure of the water directed from the booster pump to the injector.

16. A method of treating water with ozone and discharging the treated water from a pressurized treatment tank on a demand basis, comprising a) directing water from a pressurized water supply to an ozone treatment tank;

b) maintaining the ozone treatment tank at a pressure greater than atmospheric pressure;

c) circulating water from the pressurized ozone tank to an ozone injector and injecting ozone into the injector and mixing the ozone with the recirculating water to form a water-ozone mixture and returning the water-ozone mixture to the pressurized ozone treatment tank;

d) directing the ozone treated water from the pressurized ozone treatment tank; and e) wherein the pressure associated with the pressurized water supply acts as a pressure source for discharging the ozone treated water from the treatment tank as water from the pressurized water supply is directed into the pressure tank in response to ozone treated water being discharged from the treatment tank, thereby creating an on demand process wherein a supply of ozone treated water is constantly maintained in the pressure tank even while ozone treated water is being discharged from the treatment tank and water from the pressurized water supply is directed into the ozone treatment tank.

17. The method of claim 16 wherein the pressure of the water entering the inlet side of the injector is greater than the pressure of the water contained within the ozone treatment tank while the pressure of the water leaving the injector is approximately equal to the pressure of the water contained in the ozone treatment tank.

18. The method of claim 16 wherein the level of ozone treated water in the pressure tank remains generally constant while ozone treated water is discharged from the pressure tank and water from the pressurized water supply is directed into the treatment tank.

* * * * *